(12) United States Patent
Gross et al.

(10) Patent No.: US 8,717,390 B2
(45) Date of Patent: May 6, 2014

(54) ART-DIRECTABLE RETARGETING FOR STREAMING VIDEO

(75) Inventors: Markus Gross, Uster (CH); Alexander Hornung, Zurich (CH); Manuel Lang, Zurich (CH); Philipp Kraehenbuehl, Felben-Wellhausen (CH)

(73) Assignee: Disney Enterprises, Inc., Burbank, CA (US)

( * ) Notice: Subject to any disclaimer, the term of this patent is extended or adjusted under 35 U.S.C. 154(b) by 1017 days.

(21) Appl. No.: 12/552,224

(22) Filed: Sep. 1, 2009

(65) Prior Publication Data

US 2011/0069224 A1    Mar. 24, 2011

(51) Int. Cl.
G09G 5/00    (2006.01)

(52) U.S. Cl.
USPC .......................................... 345/648; 345/660

(58) Field of Classification Search
CPC ........ G06T 3/00; G06T 3/0006; G06T 3/0012
USPC .................................................. 345/581, 648
See application file for complete search history.

(56) References Cited

U.S. PATENT DOCUMENTS

| | | | | |
|---|---|---|---|---|
| 7,574,069 | B2 * | 8/2009 | Setlur et al. | 382/276 |
| 7,683,917 | B1 | 3/2010 | Georgiev | |
| 8,180,177 | B1 * | 5/2012 | Intwala | 382/298 |
| 8,373,802 | B1 | 2/2013 | Gross et al. | |
| 2006/0034522 | A1 | 2/2006 | Mohsenian | |
| 2006/0290778 | A1 | 12/2006 | Kitaura et al. | |
| 2010/0027876 | A1 * | 2/2010 | Avidan et al. | 382/162 |
| 2010/0259683 | A1 * | 10/2010 | Setlur | 348/581 |
| 2010/0328352 | A1 * | 12/2010 | Shamir et al. | 345/661 |

FOREIGN PATENT DOCUMENTS

| | | |
|---|---|---|
| WO | 2009070449 A1 | 6/2009 |
| WO | WO 2009/070449 | 6/2009 |

OTHER PUBLICATIONS

Kim et al., Resizing of Stereoscopic Images for Display Adaptation, Proc. SPIE 7237, Stereoscopic Displays and Applications XX, 72371S (Feb. 18, 2009).*
Agarwala, A., et al., "Keyframe-Based Tracking for Rotoscoping and Animation," ACM Transactions on Graphics, ACM, U.S., vol. 23, No. 3, Aug. 1, 2004, pp. 584-591.
PCT Search Report, PCT Appl. No. PCT/EP2010/062772, mailed Dec. 1, 2010.
Avidan, et al., "Seam Carving for Content-Aware Image Resizing," ACM Trans. Graph. 26, 3, 10, Jul. 2007.
Botsch, et al.,"High-Quality Surface Splatting on Today's GPUs," in Symposium on Point-Based Graphics (2005), pp. 17-25.

(Continued)

*Primary Examiner* — Hau Nguyen
*Assistant Examiner* — Ryan M Gray
(74) *Attorney, Agent, or Firm* — Patterson & Sheridan, LLP

(57) ABSTRACT

An integrated system and method for content-aware video retargeting. An interactive framework combines key frame-based constraint editing with numerous automatic algorithms for video analysis. This combination gives content producers a high level of control of the retargeting process. One component of the framework is a non-uniform, pixel-accurate warp to the target resolution that considers automatic as well as interactively-defined features. Automatic features comprise video saliency, edge preservation at the pixel resolution, and scene cut detection to enforce bilateral temporal coherence. Additional high level constraints can be added by the producer to achieve a consistent scene composition across arbitrary output formats. Advantageously, embodiments of the invention provide a better visual result for retargeted video when compared to using conventional techniques.

35 Claims, 9 Drawing Sheets

(56) References Cited

OTHER PUBLICATIONS

Buck, Ian, "GPU Computing with NVIDIA CUDA," in SIGGRAPH '07 Course Notes, 2007.
Chen, et al., "A visual attention model for adapting images on small displays," Multimedia Systems, pp. 1-12, 2003.
Deselaers, et al., "Pan, Zoom, Scan—Time-coherent, Trained Automatic Video Cropping," 2008.
Ell, et al., "Hypercomplex Fourier Transforms of Color Images," IEEE Transactions on Image Processing vol. 16, No. 1, Jan. 2007, pp. 22-35.
Gal, et al., "Feature- aware texturing," In Proceedings of Eurographics Symposium on Rendering, pp. 297-303, 2006.
Greene, et al., "Creating Raster Omnimax Images from Multiple Perspective Views Using the Elliptical Weighted Average Filter," IEEE Comput. Graph. Appl. 6, 6, pp. 21-27, Jun. 1986.
Guo, et al., "Spatio-temporal Saliency Detection Using Phase Spectrum of Quaternion Fourier Transform", CVPR, 2008.
Horn, et al., "Determining Optical Flow," Artificial Intelligence 17, 1-3, pp. 185-203, 1981.
Itti, et al., "A Model of Saliency-based Visual Attention for Rapid Scene Analysis," IEEE PAMI 20, 11, pp. 1-5, 1998.
Knoche, et al., "The Kindest Cut: Enhancing the User Experience of Mobile TV through Adequate Zooming," in ACM Multimedia, pp. 87-96, 2007.
Kraevoy, et al., "Non-homogeneous Resizing of Complex Models" ACM Trans. Graph. vol. 27, No. 5, Dec. 2008.
Liu, et al., "Video Retargeting: Automating Pan and Scan," in ACM Multimedia, pp. 241-250, 2006.
Rubinstein, et al., "Improved Seam Carving for Video Retargeting," ACM Transactions on Graphics, vol. 27, No. 3, Article 16, pp. 1-9, Aug. 2008.
Rubinstein, et al., "Multi-operator Media Retargeting," ACM Trans. Graph. 28, 3, 2009.
Schaefer, et al., "Image Deformation Using Moving Least Squares," ACM Trans. Graph. 25, 3, pp. 533-540, 2006.
Segal, et al., "The OpenGL® Graphics System: A Specification (Version 2.1)," http://www.opengl.org., Dec. 1, 2006.
Setlur, et al., "Automatic Image Retargeting," in MUM, pp. 59-68, 2005.
Viola, et al., "Robust Real-Time Face Detection," IJCV 57, (2), pp. 137-154, 2004.
Wang, et al., "Optimized Scale-and-Stretch for Image Resizing," ACM Trans. Graph. vol. 27, No. 5, Article 118, Dec. 2008.
Wolf, et al., "Non-homogeneous Content-driven Video-retargeting," in ICCV, pp. 1-7, 2007.
Zabih, et al., "A Feature-Based Algorithm for Detecting and Classifying Scene Breaks," in ACM Multimedia, pp. 189-200, 1995.
Zhang, et al., "Shrinkability Maps for Content-Aware Video Resizing," vol. 27, No. 7, Pacific Graphics 2008.
Zwicker, et al., "EWA Splatting," IEEE Transactions on Visualization and Computer Graphics, vol. 8, No. 3, pp. 223-238, Jul.-Sep. 2002.
Zwicker, et al., "Perspective Accurate Splatting," in Proceedings of Graphics Interface 2004, pp. 247-254.
U.S. Appl. No. 12/552,228, entitled Art-Directable Retargeting for Streaming Video, filed Sep. 1, 2009.

\* cited by examiner

ART-DIRECTABLE RETARGETING FOR STREAMING VIDEO

BACKGROUND

1. Field of the Invention

The present invention relates to the field of computer graphics and, in particular, to a system and method for art-directable retargeting for streaming video.

2. Description of the Related Art

Traditionally, motion pictures and/or videos have been configured to be played back on a specific target platform, such as in a cinema screen or on a television. Examples include movies displayed in a movie theater or digital broadcast content displayed on television, where the movies may be film movies or digital cinema. In recent years, however, there has been an increasing demand for displaying video content on devices with considerably differing display formats, such the display formats used on mobile phones or MP3 players.

In order for the video content to be properly played back on these devices, the source video content must be "retargeted" to a target video format. Retargeting of video content includes performing one or more video processing operations so that the video content is better suited for the target platform. Conventional techniques for video retargeting implement a naive linear downscaling, where the source content is linearly scaled (both vertically and horizontally) to fit within the frame size of the target platform.

However, one problem with naive linear downscaling for video playback platforms such as those used on mobile phones or MP3 players is that the resultant video does not provide for a comfortable viewing experience since the proportions of the objects in the video may appear unnatural. Similar issues occur for DVD players and/or next generation free-form displays.

To overcome the problems with retargeting video using linear downscaling, a variety of techniques have been investigated that remove "unimportant" content by cropping and/or panning. Cropping techniques include trimming the width and/or height of a source video to achieve a target video with a lesser width and/or height to fit within a target video format. Panning techniques are similar to cropping techniques, where a portion of the source video is selected that matches the frame size of the target video format.

A different class of approaches removes unimportant content from the interior of the images or video. These techniques compute a manifold seam through the image data in order to remove insignificant pixels. While these approaches have shown very promising results, they are still subject to significant conceptual limitations. For example, since the seam removes exactly one pixel per scanline along the resized axis, large scale changes inevitably result in seams cutting through feature regions. In addition, the removal of certain pixels can cause visible discontinuities or aliasing artifacts.

Each of the above techniques suffers from further limitations when used for performing video retargeting, as opposed to image retargeting. In video retargeting, a number of additional issues are raised, such as temporal coherence of the warp from source format to target format. However, conventional video retargeting approaches are not capable of uniform scaling important image content.

As the foregoing illustrates, there is a need in the art for an improved technique for image and video retargeting that overcomes the limitations of conventional approaches.

SUMMARY

Embodiments of the invention provide an integrated system for content-aware video retargeting. An interactive framework combines key frame-based constraint editing with numerous automatic algorithms for video analysis. This combination gives content producers a high level of control of the retargeting process. One component of the framework is a non-uniform, pixel-accurate warp to the target resolution that considers automatic as well as interactively-defined features. Automatic features comprise video saliency, edge preservation at the pixel resolution, and scene cut detection to enforce bilateral temporal coherence. Additional high level constraints can be added by the producer to achieve a consistent scene composition across arbitrary output formats. For high quality video display, a two-dimensional (2D) version of elliptical weighted average (EWA) splatting may be adopted that reduces or eliminates aliasing artifacts, when compared to conventional techniques. Additionally, embodiments of the invention seamlessly integrate into post-production techniques. Moreover, embodiments of the invention can compute the retargeting in real-time, allowing for retargeting of video streams at a high quality to an arbitrary aspect ratio while retaining the intended cinematographic scene composition.

One embodiment of the invention provides a computer-implemented method for transforming feature regions included in a sequence of images. The method includes receiving a first sequence of images having a first image format; receiving input specifying a second image format; determining feature regions of the first sequence of images; computing a warp of the first sequence of images from the first image format to the second image format, where at least one feature region of the first sequence of images is transformed based on an affine transformation; and generating a second sequence of images having the second image format, where the second sequence of images includes the at least one feature region transformed based on the affine transformation.

Another embodiment of the invention provides a computer-implemented method for interpolating user-defined format conversion constraints based on key frames. The method includes receiving a selection of a first frame of a sequence of images, where the first frame is designated as a key frame; receiving a selection of a second frame of the sequence of images, where the second frame is designated as a key frame; receiving a first user-defined format conversion constraint defining a first feature in the first frame; receiving a second user-defined format conversion constraint defining the first feature in the second frame, where a characteristic of the first feature in the second frame is different than the characteristic of the first feature in the first frame; transforming the first feature in the first frame and the first feature in the second frame based on a first transformation factor; interpolating the characteristic of the first feature in an intervening frame disposed between the first frame and the second frame in the sequence of images based on the characteristic of the first feature in the first frame and the characteristic of the first feature in the second frame; and transforming the first feature in the intervening frame based on the first transformation factor and the interpolated characteristic of the first feature in the intervening frame.

Yet another embodiment of the invention provides a computer-implemented method for retargeting a sequence of images. The method includes receiving a source sequence of images having a first format; generating a preview sequence of images based on automatic constraints; receiving user-defined interactive constraints based on the preview sequence of images; generating a set of annotations based on the automatic constraints or the interactive constraints; and generating an output sequence of images having a second format based on the source sequence of images and the set of annotations.

Advantageously, embodiments of the invention provide a better visual result for retargeted video when compared to using conventional techniques.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
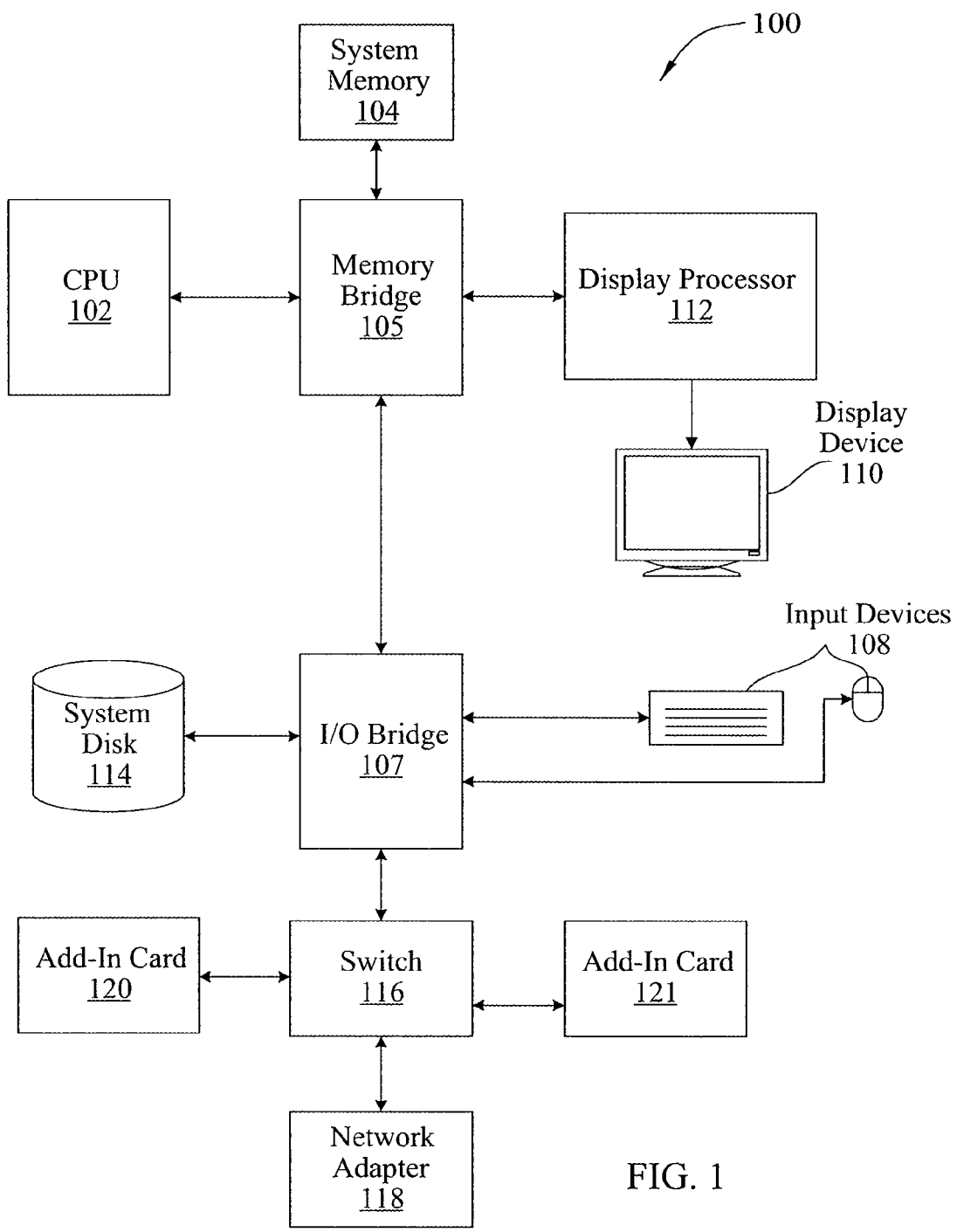
FIG. 1 is a block diagram of a system configured to implement one or more aspects of the present invention.

Embodiments of the invention provide an integrated system for content-aware video retargeting. An interactive framework combines key frame-based constraint editing with numerous automatic algorithms for video analysis. This combination gives content producers a high level of control of the retargeting process. One component of the framework is a non-uniform, pixel-accurate warp to the target resolution that considers automatic as well as interactively-defined features. Automatic features comprise video saliency, edge preservation at the pixel resolution, and scene cut detection to enforce bilateral temporal coherence. Additional high level constraints can be added by the producer to achieve a consistent scene composition across arbitrary output formats. For high quality video display, a two-dimensional (2D) version of elliptical weighted average (EWA) splatting may be adopted that reduces or eliminates aliasing artifacts, when compared to conventional techniques. Additionally, embodiments of the invention seamlessly integrate into post-production techniques. Moreover, embodiments of the invention can compute the retargeting in real-time, allowing for retargeting of video streams at a high quality to an arbitrary aspect ratio while retaining the intended cinematographic scene composition.

One embodiment of the invention provides a computer-implemented method for transforming feature regions included in a sequence of images. The method includes receiving a first sequence of images having a first image format; receiving input specifying a second image format; determining feature regions of the first sequence of images; computing a warp of the first sequence of images from the first image format to the second image format, where at least one feature region of the first sequence of images is transformed based on an affine transformation; and generating a second sequence of images having the second image format, where the second sequence of images includes the at least one feature region transformed based on the affine transformation.

Another embodiment of the invention provides a computer-implemented method for interpolating user-defined format conversion constraints based on key frames. The method includes receiving a selection of a first frame of a sequence of images, where the first frame is designated as a key frame; receiving a selection of a second frame of the sequence of images, where the second frame is designated as a key frame; receiving a first user-defined format conversion constraint defining a first feature in the first frame; receiving a second user-defined format conversion constraint defining the first feature in the second frame, where a characteristic of the first feature in the second frame is different than the characteristic of the first feature in the first frame; transforming the first feature in the first frame and the first feature in the second frame based on a first transformation factor; interpolating the characteristic of the first feature in an intervening frame disposed between the first frame and the second frame in the sequence of images based on the characteristic of the first feature in the first frame and the characteristic of the first feature in the second frame: and transforming the first feature in the intervening frame based on the first transformation factor and the interpolated characteristic of the first feature in the intervening frame.

Yet another embodiment of the invention provides a computer-implemented method for retargeting a sequence of images. The method includes receiving a source sequence of images having a first format; generating a preview sequence of images based on automatic constraints; receiving user-defined interactive constraints based on the preview sequence of images; generating a set of annotations based on the automatic constraints or the interactive constraints; and generating an output sequence of images having a second format based on the source sequence of images and the set of annotations.

System Overview

FIG. 1 is a block diagram of a system 100 configured to implement one or more aspects of the present invention. System 100 may be a computer workstation, personal computer, video game console, personal digital assistant, rendering engine, mobile phone, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

As described, embodiments of the invention provide a technique for resizing a video stream in a context-sensitive and temporally coherent manner to a different target resolution. To achieve this results, embodiments of the invention compute a spatial-temporal warp $w_r$. The warp can be defined by a function that maps coordinates in the source image to coordinates in the output image, where the output image represents an optimally retargeted output frame with respect to the desired scaling factors and additional constraints. Fully automatic warps most often fail to retain the actual visual importance or output style intended by a producer or director. Embodiments of the invention combine automatic detection of features and constraints with tool for a user to manually annotate key frames to compute the warp function.

Figure 2:
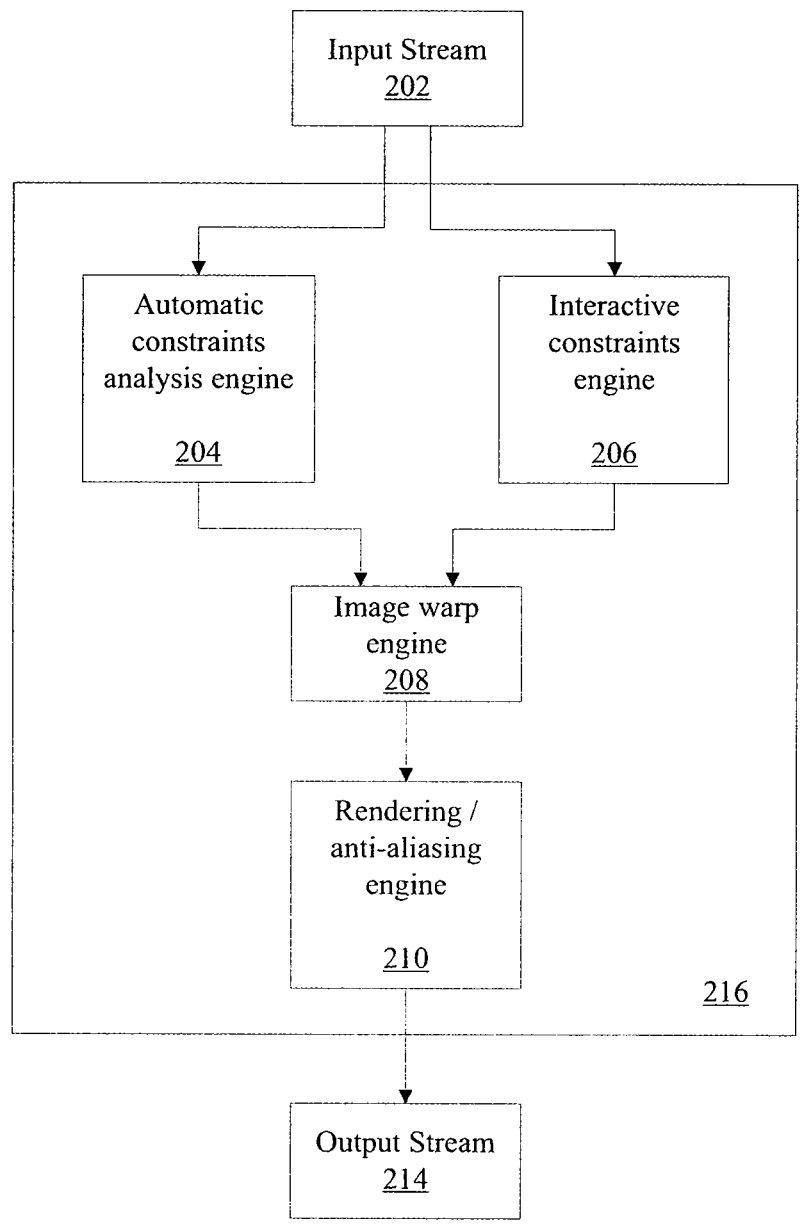
FIG. 2 is a conceptual diagram illustrating a retargeting pipeline, according to one embodiment of the invention.

FIG. 2 is a conceptual diagram illustrating a retargeting pipeline 216, according to one embodiment of the invention. As shown, the retargeting pipeline 216 includes an automatic constraint analysis engine 204, an interactive constraint engine 206, an image warp engine 208, and a rendering/anti-aliasing engine 210.

An input stream (or input image) 202 is input into the retargeting pipeline 216 and is passed to the automatic constraint analysis engine 204 and to the interactive constraint engine 206. For each frame of the input stream 202, the automatic constraint analysis engine 204 automatically estimates visually important features based on image gradients, saliency, motion, and/or scene changes. The interactive constraint engine 206 is configured to allow a user (e.g., a producer) to interactively annotate high level features and constraints with respect to the global scene composition of the input stream 202. The annotations may refer to the location, orientation, shape, and/or saliency of an image region, as well as to line constraints in the input stream 202.

The image warp engine 208 receives input from each of the automatic constraint analysis engine 204 and the interactive constraint engine 206. The image warp engine 208 is configured to generate a feature-preserving warp function from the image format of the input stream 202 to a target format for an output stream 214. The warp function is computed by minimizing an objective function $E_w$ which comprises different energy terms derived from a set of feature constraints. These energies measure local quality criteria, such as the uniformity of scaling of feature regions, the bending or blurring of relevant edges, or the spatial-temporal smoothness of the warp. As described herein, these constraints integrate seamlessly into an overall optimization technique. In some embodiments, the warp function is non-linear. In other embodiments, the warp function is linear.

In one embodiment, the warp function w is computed in a combined iterative optimization including all target terms of the energy function. Additionally, in some embodiments, each of the computational steps performed by the image warp engine 208 are performed at the pixel level in order to faithfully preserve even small scale image features. Performing these computational steps at the pixel level is a distinction from prior art approaches.

The output of the image warp engine 208 is passed to the rendering/anti-aliasing engine 210. In one embodiment, the rendering/anti-aliasing engine 210 is configured to render the output stream 214 using hardware accelerated per-pixel EWA splatting. This technique ensures real-time performance and minimizes aliasing artifacts.

Additionally, embodiments of the invention can be performed in real-time. These real-time embodiments provide instant visual feedback, thus, allowing for video editing and resizing to be accomplished in a fully interactive content production workflow. For example, high-level constraints can be stored as sparse, time-stamped key frame annotations and streamed to an end-user along with the original input stream 202. This compound video stream supports a viewing experience that matches the one intended by the video producer, in real-time, as described in greater detail herein.

In some embodiments, the retargeting pipeline 216 does not include an interactive constraint engine 206. In these embodiments, the output stream 214 that is generated is based on the computations performed the automatic constraint analysis engine 204 without any user-defined constraints.

Automatic Constraints

Figure 3:
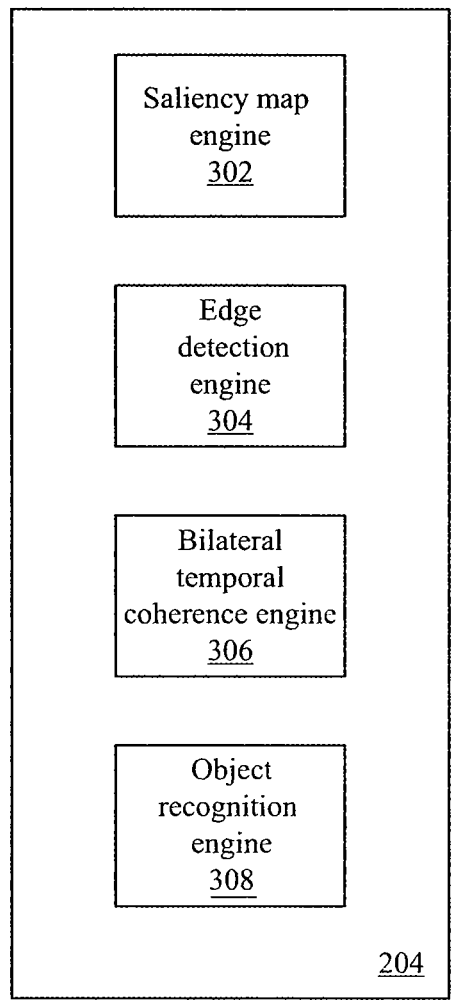
FIG. 3 is a conceptual diagram of the automatic constrains analysis engine 204, according to one embodiment of the invention.

FIG. 3 is a conceptual diagram of the automatic constrains analysis engine 204, according to one embodiment of the invention. As shown, the automatic constrains analysis engine 204 includes a saliency map engine 302, an edge detection engine 304, a bilateral temporal coherence engine 306, and an object recognition engine 308.

According to embodiments of the invention, the warp function causes resizing of input video frames according to scale factors $S_w$ and $S_h$ associated with the target width and the target height of the output video, respectively. In addition, the warp function minimizes visually disturbing spatial or temporal distortions in the resulting output frames, and retains the interactively-defined constraints from the content producer. Generating the warp function, in one embodiment, is based on formulating an energy minimization problem, where the warp function is optimized subject to the automatic and interactive constraints.

The saliency map engine 302 is configured to estimate the visual significance of image regions by the computation of saliency maps. A first class of techniques for estimating regions of general interest is termed "bottom-up," and is often based on visual attentional processes. These techniques are generally based on low-level features known to be important in human perception like contrast, orientation, color, intensity, and motion. A second class of techniques for estimating regions of general interest is termed "top-down," and uses higher-level information to detect interesting regions for particular tasks. Examples include detectors for faces or people.

One embodiment of the invention implements a fast, 2D Fourier transformation of quaternions to analyze low-level features on different scales. In alternative embodiments, other techniques are possible. In one embodiment, the resulting real-time algorithm to compute the saliency map $F_s$ captures the spatial visual significance of scene elements.

Another important visual cue is motion. Therefore, processing video requires additional estimates of the significance based on temporal features. For example, using conventional techniques, a moving object with an appearance similar to the background is classified as unimportant by spatial saliency estimators for single images. When considering the temporal context, however, such objects are stimulating motion cues and, thus, are salient. Embodiments of the invention take temporal saliency into account by computing a simple estimate of the optical flow between two consecutive video frames. Alternative embodiments are applicable to sophisticated optical flow estimation. The resulting motion estimates are added to the global saliency map $F_s$, and provide additional cues for the visual importance of scene elements.

In order to preserve salient image regions represented by $F_s$ during the resizing process, embodiments of the invention define the constraints described below for the warp function. On a global level, the warp function satisfies a target scale constraint in order to meet the intended scaling factors $S_w$ and $S_h$. Let $w_x$ denote the x-component of the warp w, let $w_y$ denote the y-component of the warp w. The global scale constraint yields:

$$\frac{dw_x}{dx} = s_w \text{ and } \frac{dw_y}{dy} = s_h. \qquad \text{(Equations 1 and 2)}$$

In feature regions of $F_s$, however, a uniform scaling factor $s_f$ is enforced to preserve the original aspect ratio:

$$\frac{dw}{dx} = \begin{pmatrix} s_f \\ 0 \end{pmatrix} \text{ and } \frac{dw}{dy} = \begin{pmatrix} 0 \\ s_f \end{pmatrix}. \qquad \text{(Equation 3)}$$

Note that unlike conventional techniques, embodiments of the invention enforce a single scale factor $s_f$ for all features. This retains the global relations and the overall scene composition more faithfully compared to individual per-feature scaling.

Embodiments of the invention discretize the warp at the pixel level and rewrite the above constraints as a least squares energy minimization. For a pixel p, let $d_x(p)$ and $d_x^x(p)$ denote the finite difference approximations of $$\frac{dw}{dx} \text{ and } \frac{dw_x}{dx},$$

respectively. The global scale energy according to Equations 1 and 2 is:

$$E_g = \sum_p (d_x^x(p) - s_w)^2 + (d_y^y(p) - s_h)^2, \quad \text{(Equation 4)}$$

and the uniform scale constraint according to Equation 3 for salient regions becomes $$E_u = \sum_p F_s(p)\left((d_x(p) - (s_f \ 0)^T)^2 + (d_y(p) - (0 \ s_f)^T)^2\right). \quad \text{(Equation 5)}$$

In one embodiment, the uniform scale parameter $s_f$ for feature regions is updated after each iteration of the optimization procedure. In another embodiment, the transformation factor for feature regions is "received" as user input and is not computed. In yet another embodiment, the transformation of feature regions is decoupled from the second format, i.e., the warp computation. Accordingly, the second format is received as input to an optimization procedure, which computes the feature transformation and the non-linear warp.

Thus, according to embodiments of the invention, the saliency map engine 302 produces uniform scaling of feature regions. The saliency map engine 302 also ensures that after the salient regions are detected in the input image, the output image is rescaled with the same scale factor in all of the salient regions.

In alternative embodiments of the invention, instead of performing a scaling operation, the saliency map engine 302 could perform any affine transformation, including rotation or translation. Additionally, in some embodiments, the transformation may be non-uniform.

The edge detection engine 304 is configured to detect edges in the input image and preserve those edges in the output image. In one embodiment, the detection of edges may be based on image gradients. Additionally, in some embodiments, the edge detection engine 304 performs edge detection at the pixel level. Performing edge detection at the pixel level allows embodiments of the invention to implement local constraints for feature edge preservation. For example, an edge map $F_e$ may be computed using a standard Sobel operator. More sophisticated edge detectors could also be used. The undesired bending of prevalent feature edges can be avoided by a spatial smoothness constraint following:

$$\frac{dw_x}{dx} = \frac{dw_y}{dy} = 0. \quad \text{(Equation 6)}$$

Embodiments of the invention provide an additional constraints to avoid edge blurring or vanishing of detail, e.g., when enlarging an image. This can be achieved by enforcing similar image gradients for feature edges $\nabla I_t = \nabla(O_t \circ w_t)$:

$$\frac{dw_x}{dx} = \frac{dw_y}{dy} = 1. \quad \text{(Equation 7)}$$

The corresponding edge bending and edge sharpness energy for the warp optimization are similar to Equation 4:

$$E_b = \sum_p F_e(p)(d_y^x(p)^2 + d_x^y(p)^2), \quad \text{(Equation 8)}$$

and $$E_s = \sum_p F_e(p)((d_x^x(p) - 1)^2 + (d_y^y(p) - 1)^2). \quad \text{(Equation 9)}$$

Performing the image warp at pixel resolution is allows for the realization of the sharpness constraint according to Equation 7.

The bilateral temporal coherence engine 306 is configured to minimize jittering artifacts in the output video. The local and unilateral constraint $$\frac{dw}{dt} = 0,$$

employed in conventional approaches, disregards the global nature of the jittering problem. For example, simply enforcing per-pixel smoothness along the temporal dimension does not take into account object or camera motion, or discontinuities such as scene cuts. Using conventional techniques, an in-depth treatment of temporal coherence requires a pre-analysis of the full sequence of images and an identification of opposing motion cues. Since embodiments of the invention are aimed at real-time processing with finite buffer sizes, embodiments of the invention opt for the following approach that balances computational simplicity and suitability for streaming video.

First, an automatic scene cut detector detects discontinuities in the video based on the change ratio of consecutive edge maps $F_e$. For example, the resulting binary cut indicator $F_c$ may yield a value of zero (0) for the first frame of a new sequence, and a value of one (1) otherwise. Using this indicator and the constraint $$\frac{dw}{dt} = 0,$$

a bilateral temporal coherence energy for the warp computation can be defined as follows:

$$E_c = F_c \sum_p d_t(p)^2. \quad \text{(Equation 10)}$$

To account for future events (e.g., characters or objects entering a scene), embodiments of the invention perform a temporal filtering of the per-frame saliency maps $F_s$ over a short time window of [t, t+k] frames of the video stream. Thus, the filter includes information about future salient regions into the current warp and achieves a more coherent overall appearance. The introduced latency of k frames can be neglected. For example, a small look ahead of k=5 frames may be sufficient. By utilizing our indicator $F_c$ for scene cuts, the saliency integration becomes aware of discontinuities in the video as well. In combination, these two bilateral constraints effectively address local as well as global temporal coherence. This bilateral saliency integration is different from the previously introduced motion estimates, significantly improving the results of temporal processing.

The object recognition engine 308 is configured to detect certain types of salient regions, such as faces, characters, or any type of object. Conventional techniques may be implemented for the object recognition engine 308.

As persons having ordinary skill in the art would understand, additional automatic constraint engines may be included in the automatic constraints analysis engine 204 shown in FIG. 3. For example, besides the presented automatic constraints, other embodiments may include other feature estimators.

Interactive Constraints

Although determining features and constraints automatically is used in any practical retargeting system, automatic detection still includes a number of limitations. First, automatic techniques fail since they cannot properly distinguish texture. For example, in an animation scenario where a character is wearing solid-color clothing of a color similar to the background, automatic techniques may fail to determine that the clothing of the character provides a different texture or surface relative to the background and, therefore, may omit the character from the feature map. This limitation can be addressed by simple editing of the corresponding feature maps. However, manually editing feature maps to include each salient feature can become time-consuming. Second, automatic techniques are inherently limited in the representation of global shape constraints or higher-level concepts of scene composition.

Manual editing and annotation of user-defined constraints, however, is prohibitively cumbersome if done on a per-frame basis. Therefore, according to some embodiments of the invention, key frame video editing may be implemented to design a workflow that allows users to annotate constraints on a sparse set of key frames. As explained herein, these user-defined constraints may be propagated throughout the sequence of images.

Figure 4:
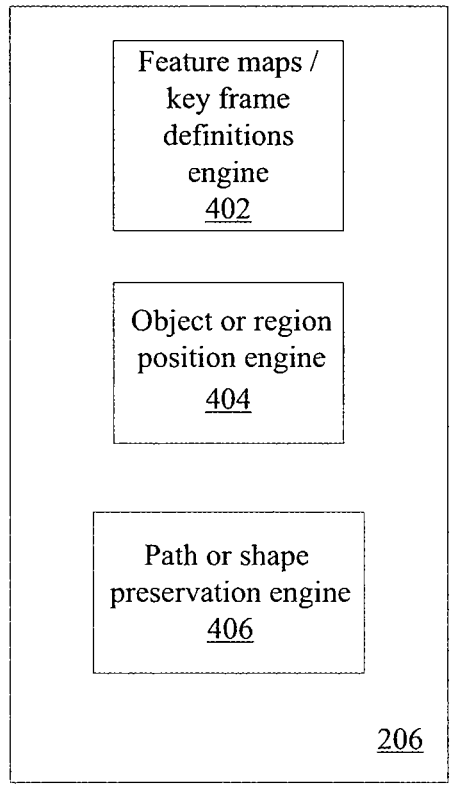
FIG. 4 is a conceptual diagram of the interactive constraints engine 206, according to one embodiment of the invention.

FIG. 4 is a conceptual diagram of the interactive constraints engine 206, according to one embodiment of the invention. As shown, the interactive constraints engine 206 includes a feature map/key frame definition engine 402, an object or region position engine 404, and a path or shape preservation engine 406.

The feature map/key frame definition engine 402 provides a drawing interface where a user can interactively select an arbitrary frame from the video, label it as a key frame and modify the saliency map $F_s$ associated with the frame by manually specifying the importance of individual image regions. An example is described below in FIG. 7.

In particular, for more complex scenes, the realization of an intended visual composition often requires the specification of positional constraints for certain scene elements. Static constraints, however, can introduce undesirable discontinuities when computing the image warp at the pixel level. Moreover, such static constraints would only be valid for a particular target size and aspect ratio and not allow for dynamic resizing of the video stream.

Instead, the object or region position engine 404 allows the user mark a region of interest R and then create a relative location constraint loc $\in [0,1]^2$ for its center of gravity cog and with respect to the input image. During the optimization, embodiments of the invention re-compute the center of gravity in each iteration i:

$$cog^i = n \sum_{p \in R} w^i(p). \quad \text{(Equation 11)}$$

where n is a normalization factor and $w^i$ corresponds to the warp computed in the i-th iteration. Next we optimize the following energy for each region R $$E_p = (loc - cog_r^i)^2. \quad \text{(Equation 12)}$$

by adding the update vector $(loc - cog_r^i)$ to all pixels in R. Here, $cog_r^i$ simply corresponds to $cog^i$ converted to relative coordinates from $[0,1]^2$.

As is known, a person's visual perception is particularly sensitive to straight lines, such as edges of man-made structures. Automatic edge bending constraints, as in Equation 6, prevents line bending locally, but cannot account for these structures on a global scope. Hence, as another high-level constraint, the path or shape preservation engine 406 provides an interface for the user to preserve curves and shapes globally. An example of a path constraint is a line constraint. A line constraint is created by simply drawing a curve represented as l: $\sin(\alpha)x + \cos(\alpha)y + b = 0$ in a frame of the input video. The path or shape preservation engine 406 estimates the intersection of this line with the underlying pixel grid of the image, and assigns a corresponding coverage value $c(p) \in [0, \sqrt{2}]$ and enforces $$\sin(\alpha)w_x(p) + \cos(\alpha)w_y(p) + b = 0 \quad \text{(Equation 13)}$$

for each pixel p where c(p) is greater than zero (0). The objective function for the least squares optimization is:

$$E_L = \sum_p c(p)(\sin(\alpha)w_x(p) + \cos(\alpha)w_y(p) + b)^2. \quad \text{(Equation 14)}$$

Updates of line orientation and position can again be computed from the derivatives of Equation 13 with respect to $\alpha$ and b, similar to the estimation of $s_f$ described above with respect to automatic constraints. An example is described below in FIG. 8.

Energy Optimization

In one embodiment, the combined warp energy generated from all available target terms yields an energy optimization equation:

$$E_w = E_g + \lambda_u E_u + \lambda_b E_b + \lambda_s E_s + \lambda_c E_c + \lambda_p E_p + \lambda_L E_L \quad \text{(Equation 15)}$$

where $E_g, \lambda_u E_u, \lambda_b E_b, \lambda_s E_s, \lambda_c E_c$ define automatic constraints and $\lambda_p E_p$ and $\lambda_L E_L$ define interactive constraints.

In one embodiment, the minimization of this energy equation constitutes a non-linear least squares problem that may be solved using an iterative multi-grid solver on a GPU. Note that our actual implementation allows for multiple interactive constraints. For boundary pixels of a video frame, the respective coordinates are set as hard constraints. In some embodiments, the λ weights can be edited interactively by the user. Also, in some embodiments, there may be multiple line and/or position constraints in the energy optimization equation.

For example, of the four weighting parameters λ controlling the automatic constraints, $\lambda_u$ for uniform scaling of features may be set to $\lambda_u=100$. For the remaining three parameters, default values may be used: $\lambda_b=100$, $\lambda_s=10$, and $\lambda_c=10$. As persons having ordinary skill in the art would understand, additional benefits of the retargeting technique described herein may be achieved by modifying the values of these parameters for different inputs, such as real-world scenes, cartoons, or text. For increased flexibility, the influence of interactive constraints can be weighted on a continuous scale. Some embodiments, however, simply use a value of 100 for both parameters $\lambda_p$ and $\lambda_L$.

Figure 5:
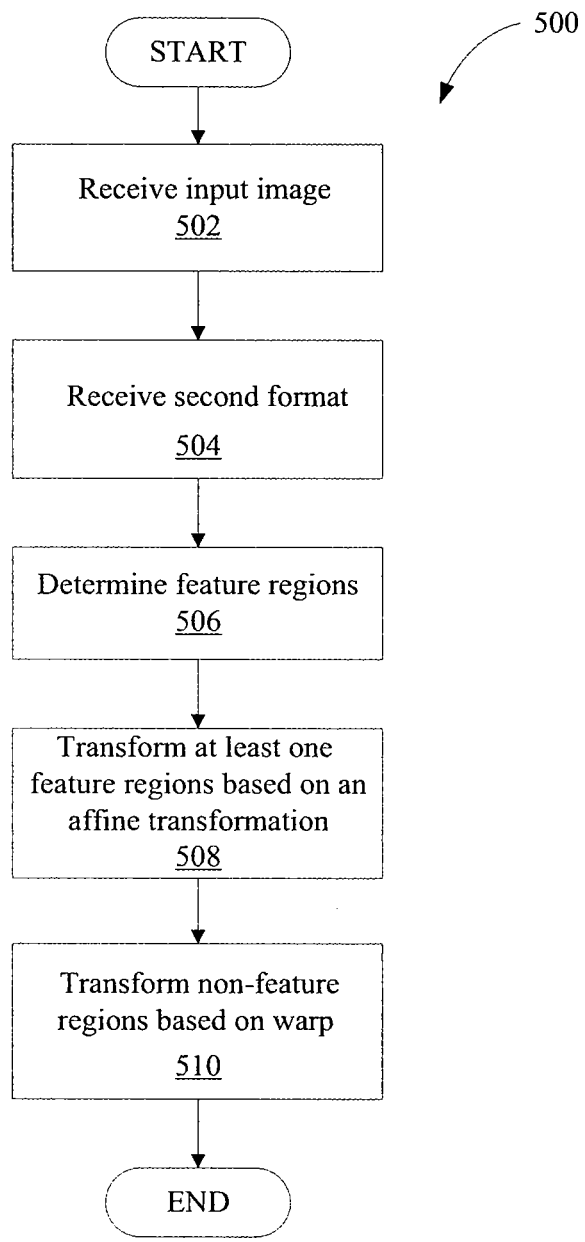
FIG. 5 is a flow diagram of method steps for uniform transformation of feature regions, according to one embodiment of the invention.

FIG. 5 is a flow diagram of method steps for transformation of feature regions, according to one embodiment of the invention. Persons skilled in the art will understand that, even though the method 500 is described in conjunction with the systems of FIGS. 1-4, any system configured to perform the method steps, in any order, is within the scope of embodiments of the invention.

As shown, the method 500 begins at step 502, where a retargeting engine receives an input image. As described, the input image may be a stand-alone image or a single frame in a sequence of images. In one embodiment, the input image is associated with a first format. A format, or "image format," refers to sequence of images having a certain frame size, an aspect ratio, a display resolution, a compression technique, a frame rate, an interlaced or progressive video, a color space, a number of bits per pixel, a video quality, a bit rate, and/or a number of channels for the video, among characteristics. In some embodiments, the sequence of images comprises a stereoscopic sequence of images where some images provide a left eye view and other images provide a right eye view. In other embodiments, the sequence of images comprises time-based images that progress forward (and/or backward) in time. In still further embodiments, the sequence of images comprises three-dimensional (3D) images.

At step 504, the retargeting engine receives a second format. In one embodiment, the second format is received as user input. In one embodiment the first format is configured for playback on a cinema screen, and the second image format is configured for playback on a video display such as a television, home cinema, projector, LCD screen, or other video display.

At step 506, the retargeting engine determines feature regions. As described above, embodiments of the invention provide for automatic detection of feature regions and/or user-definition of feature regions.

At step 508, the retargeting engine transforms at least one feature region. As described above, in various embodiments, the transformation may be an affine transformation, a projective transformation, or any other type of transformation. For example, the transformation may be a scaling operation. In some embodiments, all of the feature regions are transformed. In still further embodiments, all of the feature regions are transformed based on a uniform affine transformation. At step 510, the retargeting engine transforms non-feature regions based on a warp and not based on the affine transformation of the feature regions, as described herein. In one embodiment, the warp is a non-linear warp. Although the method 500 is described in relation to a single input image, in some embodiments, the transformation at step 508 may utilize the same transformation factor (e.g., scaling factor) for each feature region in each frame of a sequence of images. In alternative embodiments, the transformation factor is not uniform across video frames and/or is not uniform across feature regions.

Figure 6:
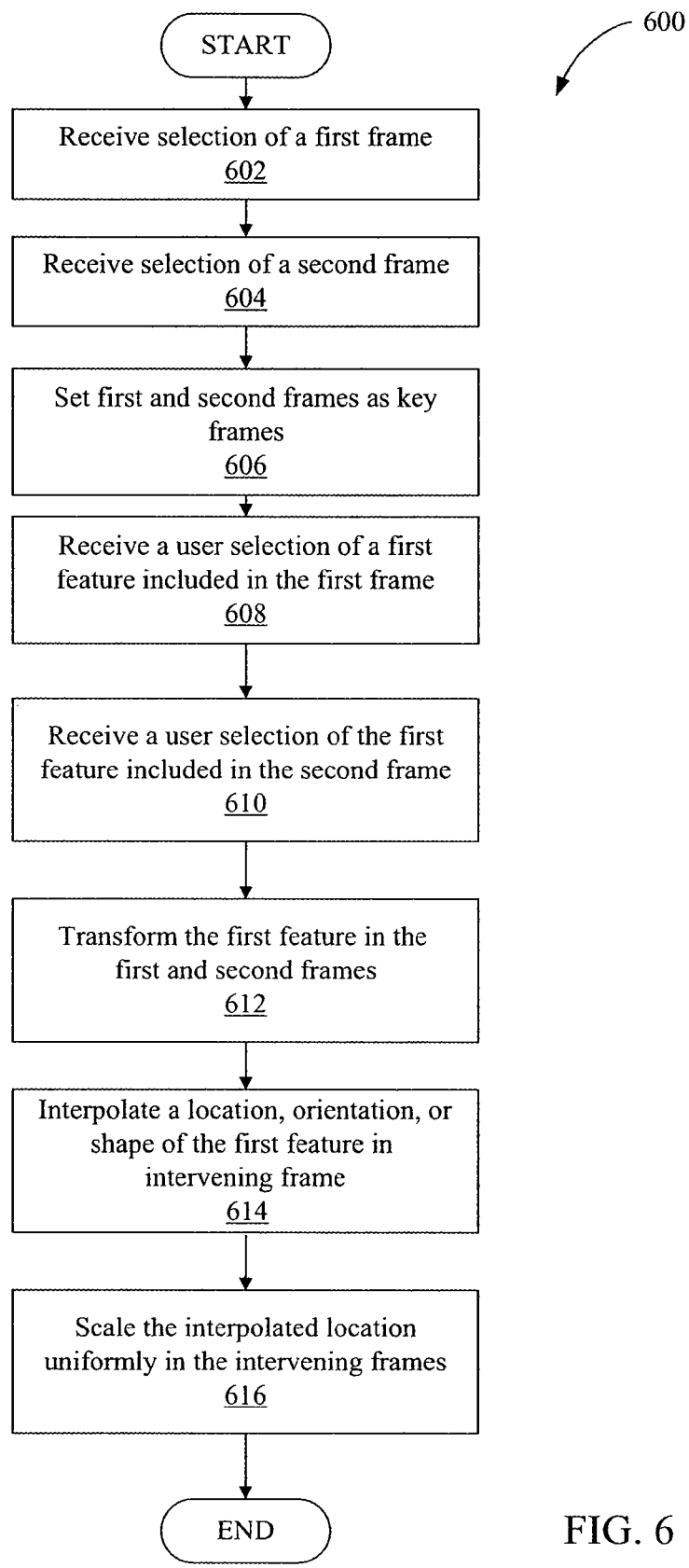
FIG. 6 is a flow diagram of method steps for interpolating user-defined constraints based on key frames, according to one embodiment of the invention.

FIG. 6 is a flow diagram of method steps for interpolating user-defined constraints based on key frames, according to one embodiment of the invention. Persons skilled in the art will understand that, even though the method 600 is described in conjunction with the systems of FIGS. 1-4, any system configured to perform the method steps, in any order, is within the scope of embodiments of the invention.

As shown, the method 600 begins at step 602, where a retargeting engine receives a selection of a first frame included in a sequence of images. At step 604, the retargeting engine receives a selection of a second frame included in the sequence of images. In one embodiment, the second frame may be subsequent to the first frame in time. At step 606, the retargeting engine receives a user selection that sets each of the first frame and the second frame as key frames of the sequence of images. In one embodiment, the first frame and the second frame may already be key frames of the sequence of images; thus, step 606 is omitted.

At step 608, the retargeting engine receives a user-defined format conversion constraint defining a first feature in the first frame. For example, a character may be depicted in the first frame. The user may utilize various commercial tools to define or draw a shape around the character in the first frame, indicating that the region enclosed by the shape corresponds to the first feature. In one embodiment, the tools are provided as part of the interface of the retargeting engine. In alternative embodiments, the tools may be provided by an application other than the retargeting engine. As described, the feature region should be scaled uniformly to preserve the visual importance of the image.

At step 610, the retargeting engine receives a user-defined format conversion constraint defining the first feature in the second frame. Continuing with the example above, the character may also be depicted in the second frame, but in a different position and/or orientation. Again, the user may utilize the tools provided by the retargeting engine to draw a shape around the character in the second frame, indicating that the region enclosed by the shape corresponds to the first feature. In one embodiment, a characteristic of the first feature in the second frame is different than the characteristic of the first feature in the first frame. In some embodiment, the characteristic comprises a location, an orientation, or shape of the first feature.

At step 612, the retargeting engine transforms the first feature using a transformation factor in each of the first and second frames. In one embodiment, the transformation is an affine transformation. In some embodiments, the affine transformation is a scaling operation. At step 614, the retargeting engine interpolates the characteristic of the first feature in an intervening frame between the first frame and the second frame. At step 616, the retargeting engine transforms the first feature included in the intervening frame based on the characteristic of the first feature in the first frame and the characteristic of the first feature in the second frame. In some embodiments, the method 600 may be applicable to various constraints, including feature maps, line constraints, and/or position constraints. Although the example is described primarily with respect to a feature map constraint, line constraints and position constraints and other types of constraints are equally applicable in combination with the feature map constraint or as stand-alone constraints. A conceptual example of interpolating a location of the first feature in intervening frames is described in FIG. 7.

Figure 7:
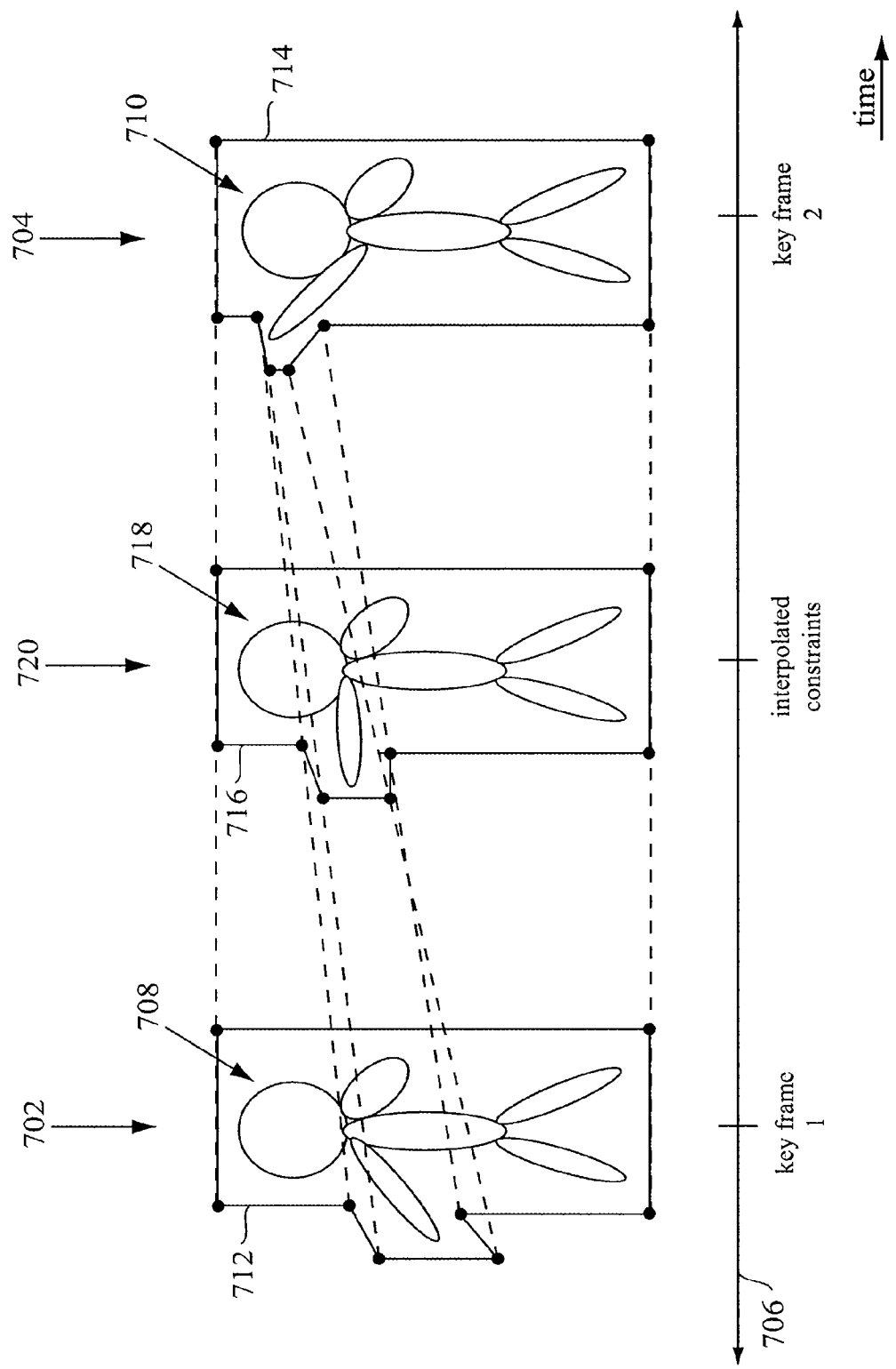
FIG. 7 is a conceptual diagram illustrating interpolating user-defined constraints based on key frames, according to one embodiment of the invention.

FIG. 7 is a conceptual diagram illustrating interpolating user-defined constraints based on key frames, according to one embodiment of the invention. As shown, a first frame 702 is designated as a first key frame and a second frame 704 is indicated as a second key frame along a time axis 706. A character 708 is included in the first frame 702. A character 710 is included in the second frame 704. In one embodiment, character 708 and character 710 correspond to the same character at different frames of a sequence of images. For example, character 708 depicts a humanoid character with one arm held down; whereas, character 710 depicts the humanoid character with the same arm held up. As described above, the character may be considered a "feature" of the sequence of images, and should, therefore, be scaled uniformly.

As shown, a user has drawn a shape 712 around the character 708 included in the first key frame 702. Similarly, the user has drawn a shape 714 around the character 710 included in the second key frame 704.

As described above in FIG. 6, the retargeting engine is configured to interpolate a shape 716 surrounding the character 718 in an intervening frame 720 between the first frame 702 and the second frame 704. As shown, the arm of the character is in a position between the held-down position depicted in the first frame 702 and the held-up position depicted in the second frame 704. Accordingly, a user may define feature regions for a subset of the frames of a sequence of images, and the retargeting application is configured interpolate the location and orientation of the character at intervening frames. Those interpolated regions may then be scaled uniformly since those regions comprise feature regions. As shown, the example of FIG. 7 represents a region surrounding a character. In other embodiments, the region may represent any object in the scene or an arbitrary region of the scene that is not associated with a particular object. In some embodiments, the interpolated paths of any type of constraint (e.g., feature map, position, or line) do not have to be linear in time and space, but could be curved or subject to acceleration or deceleration. Additionally, persons having ordinary skill in the art will understand that that illustration of FIG. 7 is a abstract and is not meant to precisely convey how interpolation, and in particular, linear interpolation, is performed.

Figure 8:
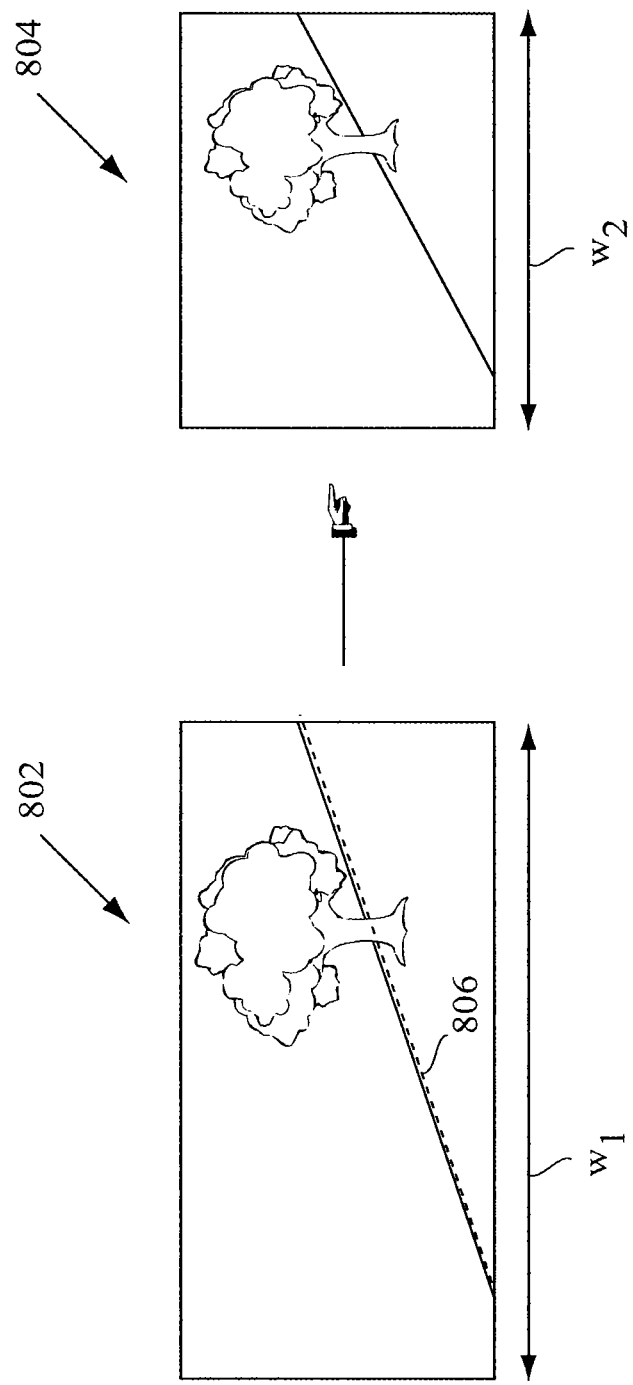
FIG. 8 is a conceptual diagram illustrating an example of a user-defined line constraint, according to one embodiment of the invention.

FIG. 8 is a conceptual diagram illustrating an example of a user-defined line constraint, according to one embodiment of the invention. As shown, a source image 802 having a width $w_1$ is retargeted to a target image 804 having a width $w_2$. In one embodiment, width $w_2$ is less than width $w_1$.

In one embodiment, a user may select a linear feature of the source image 802. In the example shown, a tree is depicted on a mountainside. The user may designate the mountainside as a feature region to be preserved in the target image 804 by drawing a line 806 that follows the path of the mountainside. Using embodiments of the invention, when the source image 802 is retargeted to the target image 804, the line defined by the mountainside remains straight since the user has identified a line constraint that follows the mountainside. Accordingly, visually important features are better preserved, when compared to using automatic techniques. Additionally, in some embodiments, the path that is drawn to represent the "line" constraint is non-linear and is curved. In still further embodiment, the path does not follow an edge in the frame. For example, a line constraint can be drawn through the middle of a trunk of a tree and does not need to be drawn along the edge of the tree trunk.

Implementation Embodiments

According to embodiments of the invention, once the warp w, is computed, the actual output frame is rendered. The non-linearity of the warp, however, alters the spectral energy distribution of the video frame and potentially introduces high-frequency energy into the frame's Fourier spectrum. For aliasing-free imaging, such spurious frequencies can be eliminated from the output signal by proper bandlimitation. In addition, the different resolution target frame may require further bandlimitation to respect the Nyquist criterion.

Some existing techniques render the output frames by simple forward mapping, e.g., by applying the warp directly to the underlying grid of $I_t$ and by rendering the deformed grid as textured quads. This operation can be computed efficiently, in particular for coarser grids. However, at the pixel level, such approaches resort to the graphics hardware for texture lookup and filtering. Correct backward mapping additionally requires the computation of an inverse warp $(w_1^{-1})$, which is highly complex and due to the non-bijectivity not possible in all cases.

Therefore, embodiments of the invention provide video rendering based on elliptically weighted average (EWA) filtering. In short, this framework includes a reconstruction filter to continuously approximate the discrete input signal. After warping the input video signal to the output frame, an additional low pass filter bandlimits the signal to the maximum allowable frequencies set by the output resolution. The EWA splatting technique provides an elegant framework to combine these two filters into an anisotropic splat kernel. While originally being devised for 3D rendering, embodiments of the invention tailor EWA splatting to the case of 2D image synthesis for high quality, aliasing-free output. To our knowledge anti-aliasing has not been treated rigorously in previous work on image or video retargeting.

As described herein, embodiments of the invention can be practiced in real-time. In order to achieve real-time performance, embodiments of the invention may implement the retargeting pipeline on a GPU, using CUDA for the feature estimation and energy minimization and OpenGL for the EWA image synthesis. The different types of feature estimation techniques described herein can be transferred to the GPU in a straightforward manner. From a technical point of view, the key components of the technique involve a multi-grid solver for computing the warp function and the EWA-based rendering. In alternative embodiments, the corresponding system could be solved on any computation platform, such as a CPU-based platform using a different graphics API (e.g., DirectX) and using different equation solvers. Persons skilled in the art will appreciate that the hardware systems and methods described herein may be implemented on many different hardware and software platforms and none of the platforms described herein in any way limit the scope of the present invention.

More particularly, the non-linear least squares minimization of $E_w$ is based on a standard coarse-to-fine multi-grid method implemented on the GPU. For each frame $I_t$, the corresponding per-pixel warp $w_t$ is computed by iteratively solving an equation system $A*w_t=b$ where A and b are set up from the energies described above. Boundary pixels are set as hard constraints.

The optimal least squares solution to all constraints might include fold-overs of the warped pixel grid so that the output image is undefined in these regions. One approach to address this problem is to increase the penalty for edge bending. However, this method cannot fully prevent fold-overs since the optimization might violate the edge bend constraint in favor of other energy terms. Moreover, this penalty introduces a global smoothing of the warp so that the available degrees of freedom cannot be utilized to retarget the image. Embodiments of the invention utilize a more robust solution to incorporate hard constraints with respect to the minimal allowed size $\epsilon$ of a warped grid cell (i.e., pixel). In our current implementation we simply chose $\epsilon=0.1$. This approach prevents fold-overs and has the considerable advantage that it does not introduce undesirable global smoothness into the warp. As a second advantage, this size constraint prevents a complete collapse of homogeneous regions and other singularities in the warp which would result in visible artifacts.

Given these additional constraints, the multi-grid optimization starts at the coarsest level where the corresponding equations are derived from A and b using the so-called "full weighting approach." Due to the convergence properties of the techniques described herein, the warp can be re-initialized in every frame based on the target scaling factors $S_w$ and $S_h$. This considerably simplifies the construction of the multi-grid hierarchy. In our current implementation, the solver performs forty (40) iterations on coarse grid levels that are reduced to only five (5) iterations at the pixel level resolution. For the free variables, such as the uniform scale factor for feature regions $S_f$ or the line constraint parameters, optimized values are estimated after each iteration.

Figure 9:
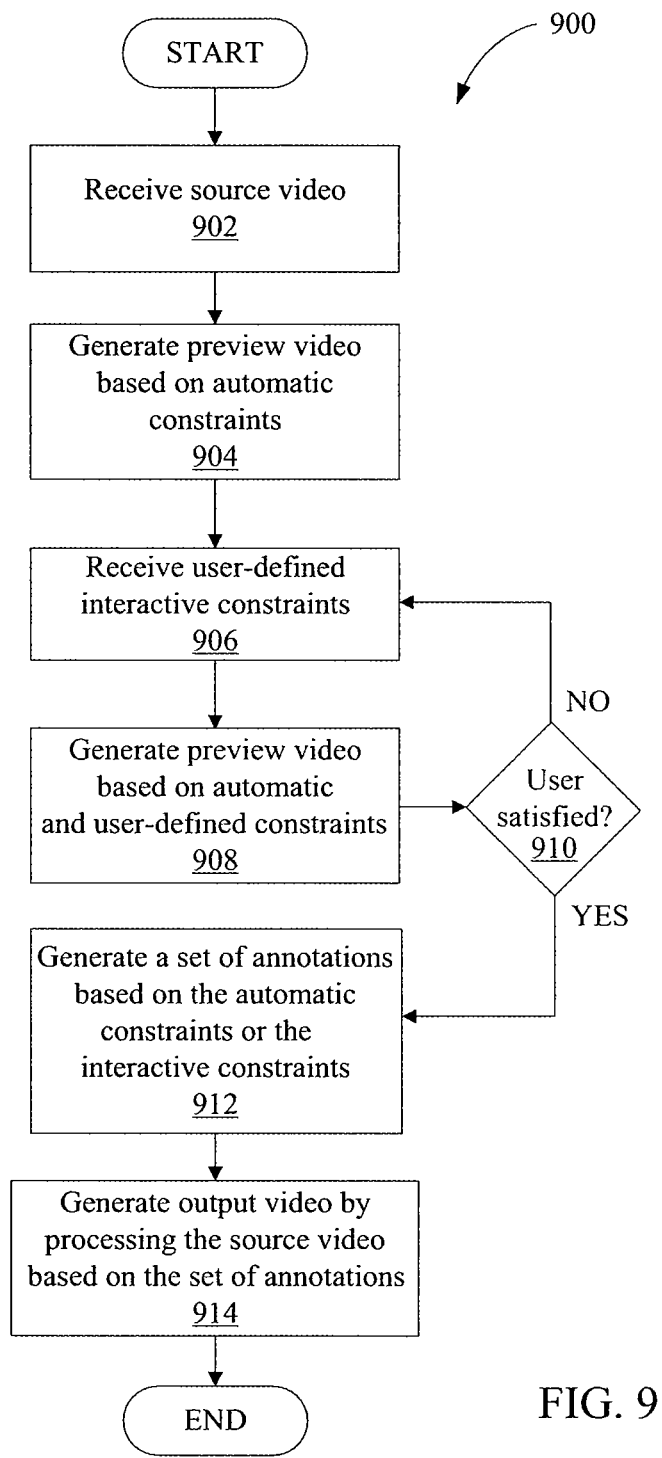
FIG. 9 is a flow diagram of method steps for retargeting a sequence of images in real-time, according to one embodiment of the invention.

As described herein, embodiments of the invention can be practiced in real-time. FIG. 9 is a flow diagram of method steps for retargeting a sequence of images in real-time, according to one embodiment of the invention. Persons skilled in the art will understand that, even though the method 900 is described in conjunction with the systems of FIGS. 1-4, any system configured to perform the method steps, in any order, is within the scope of embodiments of the invention.

As shown, the method 900 begins at step 902, where the retargeting engine receives a source video. In one embodiment, the source video includes a sequence of images. At step 904, the retargeting engine generates a preview of a retargeted version of the source video, based on automatic constraints. As described above in FIG. 3, the automatic constraints may include a saliency map and/or scaling, edge preservation, bilateral temporal coherence, face detection, and/or other constraints.

At step 906, the retargeting engine receives one or more user-defined interactive constraints. As described in FIG. 4, the interactive constraints may include a feature map, an object position, and/or line preservation constraints. At step 908, the retargeting engine generates a preview based on the automatic constraints and the user-defined interactive constraints. In one embodiment, editing the user-defined interactive constraints is an iterative process, where a loop provides instant feedback to the user. At step 910, if the user is not satisfied with the user-defined interactive constraints, then, the method 900 returns to step 906, described above. If, at step 910, the user is satisfied with the user-defined interactive constraints, then the method 900 proceeds to step 912.

At step 912, the retargeting engine generates a set of annotations for the source video based on the automatic constraints or the interactive constraints. In one embodiment, the set of annotations corresponds to key frames of the source video. In alternative embodiments, the set of annotations corresponds to an arbitrary number of frames of the source video, including all of the frames.

At step 914, the retargeting engine generates output video by processing the source video based on the set of annotations. In one embodiment, step 914 includes interpolating the constraints of key frames of the source video to intervening frames to generate the output video.

In some embodiments, the video playback unit that is playing back the output video performs step 914 in real-time during video playback. Accordingly, the source video and the set of annotations are provided to the video playback unit, which generates the output video based on the source video and the set of annotations. Thus, embodiments of the invention provide a technique whereby the source video can be retargeted to any number of arbitrary target formats by simply generating a single set of annotations that is valid for any number of different target formats and/or platforms.

In other embodiments, step 910 may be pre-computed and the output video may be stored on a physical medium, such a film reel or DVD. The output video may then be played back without any special computation required to generate the output video. In one embodiment, the output video comprises a format compatible with digital cinema. The output video may then be played back in on a cinema screen.

In one embodiment, the set of annotations is based on the interactive constraints and is not based on the automatic constraints. For example, the retargeting engine may store the interactive constraints as annotations with the output video. The automatic portion of the retargeting analysis is therefore re-computed each time the output video is generated. This approach minimizes the bandwidth needed to transfer the source video, since the annotations for the automatic constraints (e.g., saliency maps, line constraints, temporal coherence constraints, etc.) do not have to be transferred to the target output platform. In alternative embodiments, the set of annotations is based the automatic constraints and the interactive constraints. For example, the retargeting engine may store the automatic constraints and the interactive constraints as annotations with the output video. In these embodiments, the target output platform only has to compute the warp and does not need to perform the automatic analysis. However, these approaches may increase the required bandwidth, since the automatic constraints are also transferred to the target output platform.

In sum, embodiments of the invention overcome the limitations of conventional approaches and provide a different perspective on video retargeting. More specifically, embodiments of the invention present a comprehensive framework that considers the problem domain in its full entirety. The framework combines automatic content analysis with interactive tools using on the concept of key frame editing. Within an interactive workflow, the content producer can define global constraints to guide the retargeting process. The user interaction enables the content producer to annotate video with additional information about the desired scene composition or object saliency, which would otherwise be impossible to capture by currently available fully-automatic techniques. Embodiments of the invention augment the original video format with sparse annotations that are time-stamped and stored with the key frames. During playback, embodiments of the invention compute an optimized warp considering both automatically-computed constraints as well as the constraints defined by the annotations. This approach enables embodiments of the invention to achieve a consistent, art-directed viewing experience that preserves important cinematographic and/or artistic intentions to the maximum extent possible when streaming video to arbitrary output devices.

One distinctive technical feature of embodiments of the invention is the per-pixel warp to the target resolution. As described, embodiments of the invention compute and render the output video in real-time using a GPU-based multi-grid solver combined with a 2D variant of EWA splatting.

One advantage of the techniques described herein is that spatial-temporal constraints can be defined at pixel-accuracy without sacrificing performance. Thus, the bilateral temporal coherence is sensitive to scene cuts, which achieves better results when compared to prior art techniques. Additionally, other constraints retain the sharpness of prevalent object edges without introducing blurring or aliasing into the output video.

A second advantage is that the warp does not require strong global smoothness parameters in order to keep the warp field consistent at the pixel level. Therefore, the warp can utilize the available degrees of freedom more effectively, achieving significant improvement in the automatic portion of feature preservation.

A third advantage is that the use of real-time, per-pixel operations to resolve a variety of technical and practical limitations allow for seamless integration of automatic feature estimation and interactive guidance to the retargeting process. For example, when a large amount of video is captured in a first format and now needs to be retargeting to a second format, the retargeting can be performed in real-time. Thus, the entire volume of target video does not need to be precomputed from the source. A huge amount of time is saved, from a producer's perspective, since the retargeting can be done in real-time.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for transforming feature regions included in a sequence of images, the method comprising:

receiving a first sequence of images having a first image format;

receiving input specifying a second image format;

determining feature regions of the first sequence of images;

computing a warp of the first sequence of images from the first image format to the second image format, by optimizing an energy equation having an energy term, wherein at least one feature region of the first sequence of images is transformed based on an affine transformation, wherein the affine transformation comprises a scaling operation based on a predefined scaling factor, wherein the energy term comprises one of a first energy term measuring uniformity of scaling of feature regions and a second energy term measuring bending and blurring of specified edges; and generating a second sequence of images having the second image format, wherein the second sequence of images includes the at least one feature region transformed based on the affine transformation, wherein at least one non-feature region included in the first sequence of images is transformed using the computed warp.

2. The method of claim 1, wherein all feature regions included in the first sequence of images are transformed based on the affine transformation.

3. The method of claim 2, wherein the scaling operation is uniform for each feature region.

4. The method of claim 1, wherein non-feature regions of the first sequence of images are not transformed based on the affine transformation.

5. The method of claim 1, wherein the first image format is configured for playback on a television or cinema screen, and the second image format is configured for playback on a portable device.

6. The method of claim 1, wherein the first image format is configured for playback on a cinema screen, and the second image format is configured for playback on a video display.

7. The method of claim 1, wherein determining the feature regions of the first sequence of images includes automatically detecting the feature regions of the first sequence of images and/or receiving a user input that identifies the feature regions of the first sequence of images.

8. The method of claim 1, wherein determining the feature regions of the first sequence of images includes determining a saliency map of the feature regions in the first sequence of images.

9. The method of claim 1, wherein determining the feature regions of the first sequence of images includes determining edges in the first sequence of images.

10. The method of claim 1, wherein determining the feature regions of the first sequence of images includes determining a temporal discontinuity in the first sequence of images.

11. The method of claim 10, wherein the temporal discontinuity comprises a scene cut.

12. The method of claim 10, wherein determining the temporal discontinuity in the sequence of images comprises utilizing edge maps of consecutive frames of the sequence of images.

13. The method of claim 1, wherein the first sequence of images comprises stereoscopic images.

14. The method of claim 1, wherein all feature regions included in the first sequence of images are transformed based on the affine transformation, wherein the scaling operation is uniform for each feature region;

wherein the warp is computed by an application, wherein the application is configured to, in respective instances, compute the warp by optimizing a respective energy equation of each energy term selected from at least two of the first energy term, the second energy term, and a third energy term measuring spatial-temporal smoothness of a specified transformation.

15. The method of claim 14, wherein the application is configured to, in respective instances, computer the warp by optimizing a respective energy equation of each energy term selected from the first, second and third energy terms, wherein the application is configured to, in respective instances, transform feature regions using the affine transformation based on each scaling factor selected from: (i) a first scaling factor received as user input and (ii) a second scaling factor computed based on the first image format, the second image format, the feature regions of the first sequence of images, and non-feature regions of the first sequence of images;

wherein the non-feature regions of the first sequence of images are not transformed based on the affine transformation, wherein the first image format is configured for independent playback on each individual output device selected from a television and a cinema screen, wherein the second image format is configured for independent playback on each individual output device selected from a portable device and a video display, wherein the first sequence of images comprises stereoscopic images.

16. The method of claim 15, wherein the application is configured to, in respective instances, determine the feature regions of the first sequence of images based on each operation selected from: (i) automatically detecting the feature regions of the first sequence of images and receiving a user input that identifies the feature regions of the first sequence of images; (ii) determining a saliency map of the feature regions in the first sequence of images; (iii) determining edges in the first sequence of images; and (iv) determining a temporal discontinuity in the first sequence of images, wherein determining the temporal discontinuity in the sequence of images comprises utilizing edge maps of consecutive frames of the sequence of images, wherein the temporal discontinuity comprises a scene cut;

wherein a selection of a first frame of the first sequence of images and a selection of a second frame of the first sequence of images are received, wherein each of the first frame and the second frame is designated as a key frame, wherein the first sequence of images includes an intervening frame disposed between the first frame and the second frame, wherein a first user-defined format conversion constraint is received that defines a first feature in the first frame, wherein a second user-defined format conversion constraint is received that defines the first feature in the second frame, wherein a characteristic of the first feature in the second frame is different than a corresponding characteristic of the first feature in the first frame, wherein the first feature in the first frame and the first feature in the second frame are each transformed based on a first transformation factor.

17. The method of claim 16, wherein the characteristic of the first feature in the intervening frame is interpolated based on the characteristic of the first feature in the first frame and the characteristic of the first feature in the second frame, whereby the first and second user-defined format conversion constraints are interpolated, wherein the interpolated characteristic is not user-specified, wherein the first feature in the intervening frame is transformed based on the first transformation factor and the interpolated characteristic of the first feature in the intervening frame;

wherein at least one non-feature region in the intervening frame is transformed using a non-linear warp function generated by optimizing an energy equation, wherein the energy equation is generated based on the interpolated characteristic, wherein the first feature in the intervening frame is not transformed based on the non-linear warp function, wherein the non-linear warp function is configured to, when applied to the first sequence of images, map from the input sequence of images to the second sequence of images.

18. The method of claim 17, wherein the first feature in the intervening frame is not transformed based on the non-linear warp function, in order to preserve the first feature to a greater extent than the non-feature region in the second sequence of images, relative to the first sequence of images, and wherein the second sequence of images is generated by applying the non-linear warp function to the first sequence of images.

19. The method of claim 18, wherein the interpolated characteristic of the first feature in the intervening claims is not linear in time and space with respect to each of the first frame and the second frame, wherein the characteristic of the first feature comprises a location, an orientation, or a shape of the first feature, wherein application is configured to, in respective instances, transform the first feature using each planar transformation selected from an affine transformation and a projective transformation, wherein the non-feature region is transformed using a non-planar transformation comprising the non-linear warp function.

20. The method of claim 19, wherein the second frame is subsequent to the first frame in time, wherein the first user-defined format conversion constraint defining the first feature in the first frame comprises a shape that is drawn around the outside of a region depicted in the first frame, wherein the region depicted in the first frame represents an object representing a character in the first frame, wherein the user selection of a first feature included in the first frame comprises a path drawn over the first frame, and wherein the path follows an edge included in the first frame.

21. The method of claim 20, wherein the second image format includes a different aspect ratio than the first image format and a different resolution than the first image format, wherein at least one feature region is transformed based on a set of annotations, wherein the set of annotations is generated based on at least one user-defined format conversion constraint and at least one programmatically generated format conversion constraint, wherein the at least one programmatically generated format conversion constraint modifies the at least one user-defined format conversion constraint.

22. The method of claim 21, wherein at least one feature region is preserved in the output sequence of images, wherein the set of automatic constraints is generated not based on any user input identifying any feature region to be preserved, wherein the set of automatic constraints includes the saliency map of the one or more feature regions in the sequence of images, wherein the set of automatic constraints further includes the edges in the sequence of images.

23. A computer-readable storage medium storing instructions that, when executed by a processor, cause a computer system to transform feature regions included in a sequence of images, by performing the steps of:

receiving a first sequence of images having a first image format;

receiving input specifying a second image format;

determining feature regions of the first sequence of images;

computing a warp of the first sequence of images from the first image format to the second image format, by optimizing an energy equation having an energy term, wherein at least one feature region of the first sequence of images is transformed based on an affine transformation, wherein the affine transformation comprises a scaling operation based on a predefined scaling factor, wherein the energy term comprises one of a first energy term measuring uniformity of scaling of feature regions and a second energy term measuring bending and blurring of specified edges; and generating a second sequence of images having the second image format, wherein the second sequence of images includes the at least one feature region transformed based on the affine transformation, wherein at least one non-feature region included in the first sequence of images is transformed using the computed warp.

24. The computer-readable storage medium of claim 23, wherein all feature regions included in the first sequence of images are transformed based on the affine transformation.

25. The computer-readable storage medium of claim 24, wherein the scaling operation is uniform for each feature region.

26. The computer-readable storage medium of claim 23, wherein non-feature regions of the first sequence of images are not transformed based on the affine transformation.

27. The computer-readable storage medium of claim 23, wherein the first image format is configured for playback on a television or cinema screen, and the second image format is configured for playback on a portable device.

28. The computer-readable storage medium of claim 23, wherein the first image format is configured for playback on a cinema screen, and the second image format is configured for playback on a video display.

29. The computer-readable storage medium of claim 23, wherein determining the feature regions of the first sequence of images includes automatically detecting the feature regions of the first sequence of images, receiving a user input that identifies the feature regions of the first sequence of images, determining a saliency map of the feature regions in the first sequence of images, determining edges in the first sequence of images, and/or determining a temporal discontinuity in the first sequence of images.

30. The computer-readable storage medium of claim 29, wherein the temporal discontinuity comprises a scene cut.

31. The computer-readable storage medium of claim 29, wherein determining the temporal discontinuities in the sequence of images comprises utilizing edge maps of consecutive frames of the sequence of images.

32. The computer-readable storage medium of claim 23, wherein the first sequence of images comprises stereoscopic images.

33. A system for transforming feature regions included in a sequence of images, the system comprising:
a processor configured to:
receive a first sequence of images having a first image format,
receive input specifying a second image format,
determine feature regions of the first sequence of images,
compute a warp of the first sequence of images from the first image format to the second image format, by optimizing an energy equation having an energy term, wherein at least one feature region of the first sequence of images is transformed based on an affine transformation, wherein the affine transformation comprises a scaling operation based on a predefined scaling factor, wherein the energy term comprises one of a first energy term measuring uniformity of scaling of feature regions and a second energy term measuring bending and blurring of specified edges; and
generate a second sequence of images having the second image format, wherein the second sequence of images includes the at least one feature region transformed based on the affine transformation, wherein at least one non-feature region included in the first sequence of images is transformed using the computed warp.

34. The system of claim 33, further comprising a memory storing instructions that, when executed by the processor, configure the processor to:
receive the first sequence of images;
receive the input specifying the second image format;
determine the feature regions of the first sequence of images,
compute the warp; and
generate the second sequence of images.

35. The system of claim 33, wherein non-feature regions of the first sequence of images are not transformed based on the affine transformation.

* * * * *